Feb. 27, 1945. L. L. HERCIK 2,370,311
ALLIGATOR SHEAR
Filed Jan. 26, 1944 2 Sheets-Sheet 1
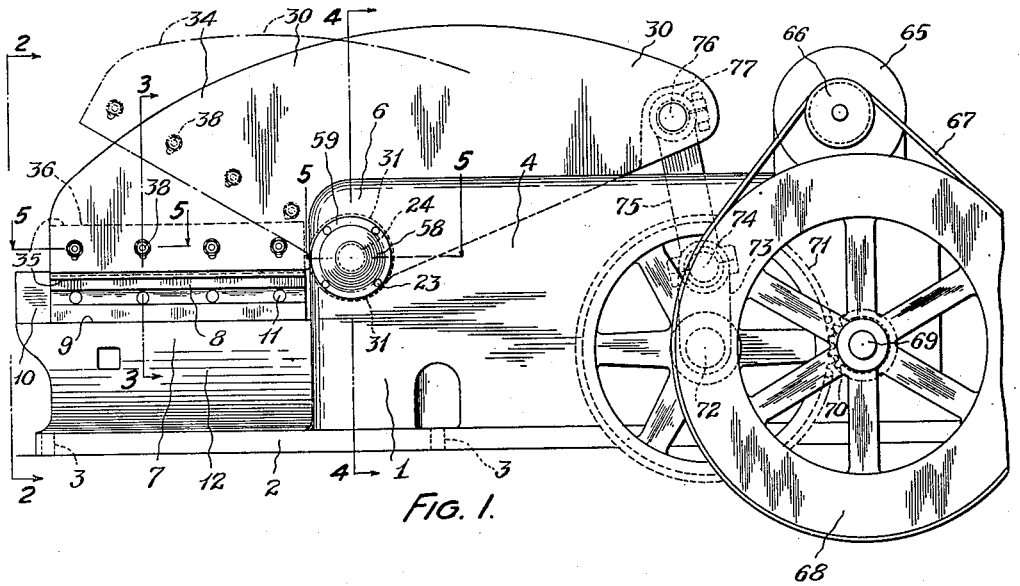
FIG. 1.
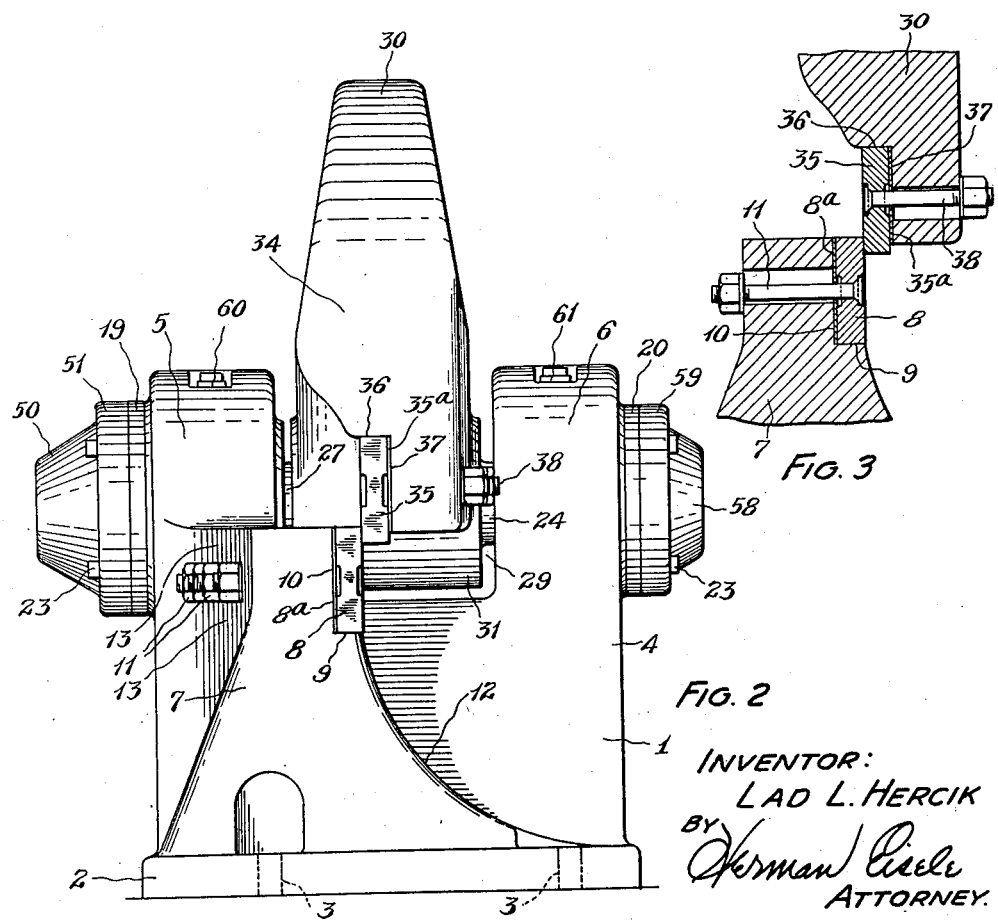
FIG. 2.
FIG. 3.
INVENTOR:
LAD L. HERCIK
BY
Herman Hiele
ATTORNEY.

Feb. 27, 1945.    L. L. HERCIK    2,370,311
ALLIGATOR SHEAR
Filed Jan. 26, 1944    2 Sheets-Sheet 2

INVENTOR:
LAD L. HERCIK
BY
Norman Eisle
ATTORNEY.

Patented Feb. 27, 1945

2,370,311

UNITED STATES PATENT OFFICE 2,370,311

ALLIGATOR SHEAR

Lad L. Hercik, Lakewood, Ohio, assignor to The Hill Acme Company, Cleveland, Ohio, a corporation of Ohio Application January 26, 1944, Serial No. 519,712

9 Claims. (Cl. 164—42)

This invention relates to machinery for shearing metals and particularly to open throated lever type shearing machines of the class, generally known as alligator shears.

Machines of this class are used in steel mills, forge shops, scrap yards, and other places, for shearing flat, square and round bars, angles, rails and other shapes. These machines are usually made with a very heavy elongated bed provided, intermediate its ends, with a king pin upon which a heavy lever arm is mounted. This lever arm is fitted at its forward end with a shear blade adapted to cooperate with a similar blade mounted in the forward end of the bed. The rear end of the lever arm is connected with power mechanism of any convenient type for oscillating or actuating the lever arm to rock about the king pin as a pivot, thus moving the shear blade on the lever arm into shearing engagement with the blade on the bed.

The present invention is particularly directed to improvements associated with the king pin of a shearing machine of the above type.

In machines of this type heretofore built, frequent failures have occurred either in the king pin itself or in the mounting of the king pin. King pins in this type of shears have usually been mounted in a pair of spaced bearings formed in ears or bosses integral with the bed, and the lever has been mounted on the pin between these spaced bearings. A stationary shear blade has been mounted on a support integral with and extending forwardly from one of the bearings in the bed and cooperating with the shear blade mounted on the adjacent face of the lever arm.

When a steel bar is sheared there occurs a very heavy side thrust, tending to move the lever away from the stationary shear blade. This thrust has always, so far as I am aware, been transmitted by various devices, to that ear on the bed laterally spaced from the stationary shear blade that is, to that ear located on the other side of the lever arm from the stationary shear blade. This has resulted in a tendency of the spaced ear to tilt outwardly causing a slight but serious misalignment of the bearing with the pin at each cutting stroke and frequently, when a heavy bar is cut, imposing a bending load on the spaced ear sufficiently heavy to cause a fracture resulting in breaking the ear off the bed of the shear.

Heretofore various devices have been associated with king pins for laterally adjusting the lever with respect to the stationary blade and for taking up wear, which devices have been expensive to produce, complicated in construction and difficult to adjust.

The hereinafter described alligator shear king pin construction and mounting have been developed to eliminate the above defects inherent in present constructions.

It is accordingly a prime object of this invention to produce a king pin construction and mounting, in a shear of this type, which overcomes the imposition of heavy axial thrusts upon that king pin supporting boss on the side of the shear spaced from the stationary shear blade.

It is a further and more direct object of this invention to produce a king pin and mounting which will transmit the lateral lever thrust, incident to the shearing action, thru the king pin against that king pin supporting base adjacent the stationary blade mounted on the bed.

It is a further object of this invention to produce a construction capable of confining the axial thrust to a self contained action in which no external axial unsupported thrust is applied to either of the ears supporting the king pin bearings.

It is a further object of this invention to produce a construction in which no loads are applied to the bearing bosses which tend to tilt the bosses and in which the loads on the bearings are limited to radial loads.

It is a further object of this invention to produce a king pin mounting which does not require any adjustable devices for laterally positioning the shear lever arm or for taking up axial wear.

It is a further object of this invention to produce a king pin which can readily be assembled or replaced and in which radial and axial bearings can readily be repaired or renewed.

A further understanding of the construction and operation and of the manner in which the novel features of this invention effect the above and further objects, will become apparent from the following detail description and the annexed drawings, which set forth certain means embodying this invention, such disclosed means constituting, however, but one of the forms in which the principle of this invention may be applied.

Referring to the annexed drawings:

Fig. 1 is a right side elevation of an alligator shear embodying this invention, the shear being shown in the closed position, an open position of the forward end of the lever arm being shown fragmentarily in dot and dash lines.

Fig. 2 is an enlarged front elevation of the alligator shear shown in Fig. 1, this view being taken from a position facing the jaws at the shearing end of the machine, indicated by line 2, 2, in Fig. 1.

Fig. 3 is a similarly enlarged, transverse sectional view thru the shearing blades of the shear shown in Fig. 1, this view being taken on the plane indicated by line 3, 3 in Fig. 1.

Figure 5:
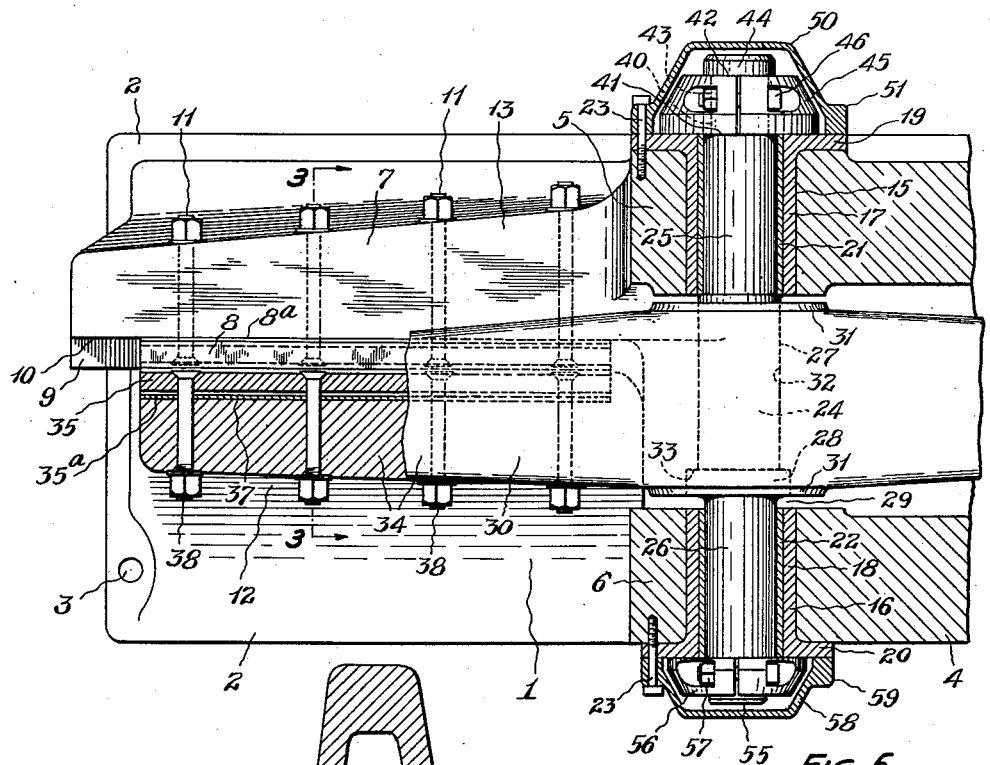
Fig. 5 is a similarly enlarged plan view of the front end of the shear shown in Fig. 1, this view being partly broken away on the planes indicated by lines 5, 5, in Fig. 1.

This alligator shear illustrated for the purpose of disclosing the present invention is elongated in its general conformation and is provided intermediate its ends with pivot mechanism for rocking or oscillating a shearing lever arm about a horizontal transverse axis, shearing mechanism being provided at the front end of the machine and suitable power mechanism being provided at the rear end of the machine for the purpose of oscillating or rocking the lever arm about the pivot mechanism.

The main frame of this improved alligator shear comprises a preferably elongated bed indicated at 1. This bed is of hollow ribbed construction and is formed with a flanged base portion 2 adapted to rest on a suitable permanent foundation or portable support depending upon the size of the shear and the purpose for which the shear is to be used. For purposes of connecting the shear to the foundation or support suitable openings 3 are provided to accommodate bolts or other connecting means.

Preferably integrally formed with the base portion is a side wall construction 4 of box conformation which extends, in the embodiment disclosed, for substantially more than one half of the length of the bed. Adjacent the forward end and preferably integrally formed with the side wall construction 4 are a pair of bosses 5 and 6 transversely spaced, the boss 5 being located at the left side of the machine as viewed in Figures 2 and 3 and the boss 6 being located at the right side of the machine.

Formed at the front of the bed and preferably integrally cast with the boss 5 is a portion 7, this portion extending upwardly from the base 2 and forwardly from the boss 5, and being disposed on the left side of the bed, that is on the same side of the bed as the boss 5. This portion 7 serves as a support for a stationary shear knife or shear blade 8 for the purpose of mounting which, the portion 7 is formed with a machined seat comprising a horizontal face 9 and a vertical face 10. The shear blade 8 may be of any desired conformation and usually is formed with cutting edges at the top and bottom of each side in order that the blade may be successively reversed and inverted when the edges become dull. This blade is secured in place by means of a plurality of countersunk head bolts 11, as clearly appears from Fig. 3 of the drawings. The lower portion of the left side of the upwardly extending portion 7 is flared sidewardly and downwardly, for the purpose of providing strength to resist lateral thrusts and in order to distribute the vertical load incident to the shearing action. The right face of the portion 7 flares sidewardly and downwardly with a curved surface substantially from the face of the stationary blade, as indicated at 12, to provide strength and to afford clearance for the parts which are sheared off in the operation of this machine. The left face of the upwardly extending portion 7 flares sidewardly in a rearward direction, as indicated at 13, to form a substantial integral and strong connection with the boss 5.

Bosses 5 and 6 are each formed with a bore indicated, at 15 and 16 respectively. These bores extend thru the bosses in a direction transverse to the length of the shear bed and are axially alined with each other and the axis of these bores is located approximately in line with the top of the stationary shear blade 8 in the embodiment disclosed.

Mounted in the bores 15 and 16 are removable sleeves or bushings 17 and 18 each formed, on that end away from the center of the bed, with a radially outwardly extending flange indicated at 19 and 20, respectively. The bushings 17 and 18, are provided with liners 21 and 22, respectively, preferably formed of antifriction material, and provided to serve as bearings for a horizontal pivot pin or king pin, hereinafter to be described. The flanged bushings 17 and 18 are secured to the bosses 5 and 6, respectively, by means of a plurality of cap screws 23. The outer faces of the flanges 19 and 20 of these bushings are accurately machined to serve as thrust bearing surfaces as will be explained.

Figure 4:
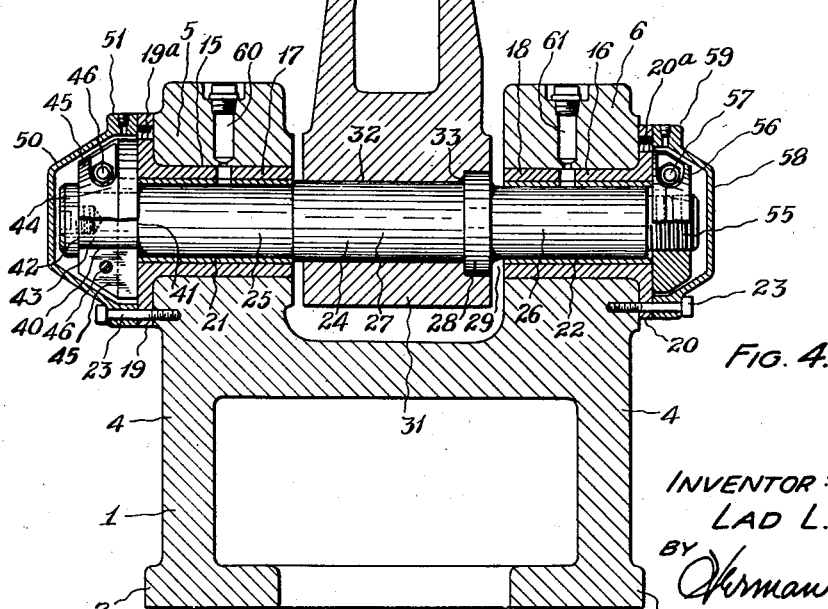
Fig. 4 is a similarly enlarged vertical transverse section of the shear shown in Fig. 1, this section being taken on a plane passing thru the axis of the king pin, this plane being indicated by line 4, 4 in Fig. 1.

Rotatably mounted in the bearings formed by the liners 21 and 22 is a king pin 24 of special conformation, best illustrated in Figures 4 and 5. As will appear from the drawings, the king pin 24 is formed with two journal portions 25 and 26 engaging the bearing surfaces of the liners 21 and 22, respectively. Intermediate these journal portions is a central portion 27 slightly larger in diameter than the journal portions 25 and 26. At the right side of the central portion 27, as viewed in Fig. 4, is a still further enlarged preferably integral annular collar or shoulder 28. The portions 27 and 28 are disposed between the spaced bosses 5 and 6, as clearly appears from the drawings.

The annular shoulder portion 28 is preferably slightly spaced from the inner face of the adjacent boss 6 and hence from the bushing 16 and liner 22, which space is clearly indicated at 29, in Fig. 4.

Mounted upon the portions 27 and 28 of the pin 24 is a shearing arm or lever arm 30 formed with a hub intermediate its ends. The hub 31 is formed with a bore 32 accurately conforming to the contour of the portions 27 and 28 of the king pin, the bore 32 being formed with a shoulder indicated at 33 engaging the left face of the collar 28, thus preventing axial movement of the lever arm 30 in a right hand direction (Fig. 4) relatively to the king pin 24.

In practice it is preferable to shrink the lever arm on the king pin in order to insure the lever arm against becoming loose on the king pin due to the severe and heavy loads to which shears of this type are subjected.

The lever arm extends both forwardly and rearwardly from the axis of the king pin 24 and is necessarily of heavy construction in order that the lever may resist the heavy stresses imposed thereon, and may be of cored, hollow or I-beam cross-section, in order that unnecessary weight may be eliminated. The forwardly extending portion 34 of the lever arm serves as a support for the movable shear blade 35. In order to accommodate this shear blade 35, a machined seat is formed in the portion 34, said seat comprising a horizontal face 36 and a vertical face 37. The shear blade 35 is preferably a duplicate of the stationary shear blade 8 for the sake of interchangeability and is formed with cutting edges at the top and bottom of each side. As in the case of the stationary blade 8, the movable blade 35 is held in place by means of a plurality of countersunk head bolts 38.

The forwardly extending portion 34 of the lever arm 30 is flared upwardly toward a point above the hub 31 of the lever to assure strength to overcome the vertical resistance to shear and is flared laterally in the direction toward the hub 31 to resist the lateral thrust and twist which is imposed upon the lever arm 30 during the shearing action. The lever arm immediately above the blade 35 is formed to provide clearance for the parts which are being sheared.

It will be evident, particularly from Fig. 2, that the right face of the lower stationary shear blade 8 and the left face of the upper shear blade 35 are substantially in the same plane, the proximity of these faces to each other being determined primarily by the dimensions and character of the parts to be sheared.

The lateral thrust resulting from and incident to the shearing action is very substantial and this thrust is transmitted by the lever arm 30 to the king pin 24 which thus imposes a very substantial thrust in an axial direction on the king pin. In order to resist this thrust and in order to prevent excessive wear resulting from this thrust, a special construction is provided at the left end or stationary shear blade end of the king pin 24, which construction will be understood by reference to Figures 4 and 5. The king pin 24 is formed, at the end adjacent the boss 5, with a relatively wide groove 40 defined by an inner shoulder 41 substantially radially alined with the face of the flange 19 and an outer shoulder 42, and an intermediate neck portion 43 smaller in diameter than the adjacent portions of the pin 24. The terminal portion of the shaft indicated at 44 is of a diameter substantially greater than the diameter of the neck portion 43 but slightly less than the diameter of the journal portions 25 of the pin.

Snugly seated in the groove portion 40 is a split collar 45 formed of two halves secured together by bolts 46. The width of this collar is preferably substantially identical with the width of the groove 40 and the bore of the split collar is preferably machined to form a clamping fit on the neck portion 43 and the inner face of the collar is accurately machined to form a smooth seat for engagement with the face of the flange 19. This collar 45, being securely clamped on the shaft, oscillates with the shaft, and the axial thrust of shaft, incident to the shearing action of the blades 8 and 35, is transmitted to the collar 45 by the enlarged terminal portion 44 and the collar in turn transmits this thrust to the face of the flange 19 of the bushing 15.

The area of contact between the inner face of the collar 45 and the face of the flange 19 is preferably so proportioned that the intensity of the thrust pressure is well within the maximum for which the engaging metals are designed. In order, however, that these engaging surfaces may be assured of long life and minimum wear I provide for their continuous and effective lubrication. For this purpose I have provided a special cover cap 50 to enclose the collar 45 and the associated parts, not only for applying lubricant but also to keep out foreign elements such as dirt, scale, etc. This cap 50 may be of any desired conformation to suit the parts to be enclosed and is, for purposes of illustration, shown in the drawings as of generally truncated conical shape forming a cavity adapted to serve as a lubricant reservoir. This cap is formed with a circular flange 51 provided with a series of openings to receive the cap screws 23 which pass thru registering openings in the flange 19, thus serving to fix both the cap 50 and the bushing 15 to the boss 5. A suitable filling opening closed with a plug is formed adjacent the top of the cap 50 for the purpose of supplying lubricant to the reservoir thus formed.

At the end of the pin 24 opposite to the thrust collar end, that is at the right end as viewed in Fig. 4, the pin 24 is formed with a thread 55 upon which is mounted a threaded split collar or nut 56 which may be adjusted axially along the pin 24 by rotating it on the pin until the nut engages the outer face of the flange 20 of the bushing 18 as tight as may be desired, whereupon the collar may be clamped in position by tightening a bolt 57. This collar 56 is provided primarily for the purpose of taking up any slack or axial loose play during assembling or to take up such loose play as may result from wear between the collar 45 and the face of the flange 19. This nut 56 accordingly prevents the lever arm 30 from moving to the left as viewed in Fig. 4.

In order to insure proper lubrication of the engaging surfaces of the collar 56 and flange 20 a cover cap 58 formed with a flange 59 is provided, this cap being provided with a plugged opening for lubricant and being held in engagement with the flange 20 and secured to the boss 6 by means of cap screws 23 in the manner similar to that described with reference to the cap 45, flange 19 and boss 5.

While lubricant is supplied to the bearings 21 and 22 and journals 25 and 26 from the oil reservoirs formed by the cover caps 50 and 58, additional lubricating wells 60 and 61 are provided in the bosses 5 and 6 for the purpose of supplying lubricant directly to the pin bearings and journals.

The oscillation or rocking of the lever arm about the axis of the pin 24 may be effected by any suitable mechanism which is preferably power actuated. Since this mechanism forms no part of this invention per se it need not be described in detail. One type of this mechanism is, however, disclosed in general form in Fig. 1.

Referring to this figure, 65 indicates the motor supported on a bracket extending upwardly from the side walls 4 of the bed 1. Upon the shaft of this motor is mounted a V-belt pulley 66 driving a plurality of laterally spaced V-belts 67, these belts engaging the periphery of a fly wheel 68 mounted on a shaft 69 which is, in turn, rotatably supported in the bed 1. Mounted on this drive shaft 69 are one or more pinions 70 engaging one or more gears 71 which in turn are mounted on a crank shaft 72. This crank shaft is mounted on suitable bearings in the bed 1 and is formed, preferably intermediate its ends and in line with the longitudinal median plane thru the lever arm 30, with a crank 73. The crank pin 74 of this crank 73, is operatively connected with a pitman or connecting rod 75 which in turn has operative connection with the rear end of the lever arm 30 by means of a wrist pin 76 having rotatable engagement with a bushing fixed in the split end 77 of the rod 75.

It will be evident that the actuation of the motor 65 causes the crank shaft 72 to rotate which in turn causes the lever arm to oscillate or rock about the king pin 24. As a result of this oscillation, the movable shear blade 35 swings angularly upwardly from the closed position, shown in the drawings, to an open position, shown partly in broken lines in Fig. 1 and then again moves to the closed position shown in full lines in the drawings, during which downward movement the shearing action takes place. This opening and closing of the shear blade may be continuous or the operation may be controlled by the operator in which event the shear is normally in an open position.

The shearing action, as is well known to those skilled in this art, produces severe side thrusts applied to the shear blades in opposite directions at the area of shear. Reference to Figures 4 and 5 will disclose that the lateral thrust imposed on the movable shear blade 35 is transmitted thru the lever arm 30 to the king pin 24 and thence to the collar 45 which, in turn, transmits the thrust to the face of the flange 19 of the bushing 17 in the boss 5. The lateral thrust acting in the opposite direction on the stationary shear blade 8 is transmitted thru the upwardly extending portion 7 of the bed to the boss 5 and thence to the flange 19 which reacts with the thrust transmitted by the inner face of the collar 45. It will therefore appear that this thrust is transmitted in two directions from the area of shear to the flange 19 on the outer face of the boss 5 in a direct and self contained manner. It will also be evident that the thrust of the stationary blade tends to move the boss 5 outwardly in an axial direction and that the thrust of the movable blade tends to move the boss 5 in an inward direction, these thrusts therefore tending to counteract each other along a line substantially coaxial with the boss 5 and the pin 24.

It will also be evident that the journal 26 is free to move axially with respect to the bearing 22 mounted in the boss 6 and that no axial thrust will be imposed on the boss 6, as a result of the transverse thrust incident to shearing. It is to be understood, however, that a clearance indicated at 29 must be maintained between the shoulder 28 on the pin 24 and between the hub 34 of the lever arm on the one hand and the bearing 22 and the bushing 18 and the associated boss 6, on the other hand, if the boss 6 is to be maintained free of axial thrust.

It will be understood that the original thickness of the shear blades should be selected approximately to suit the relative positions of the shear blade seats on the lever arm and on the bed, as fixed by the positions of the collar 45, of the face of the flange 19 and of the location of the lever arm on the pin 24. If, subsequently, wear should occur on the collar 45 or flange 19, or if the shear blades should be reduced in width as a result of grinding, shims or packing may be interposed between one or both of the shear blades and their respective vertical seats as suggested at 8a and 35a, respectively. The blades may also be adjusted toward each other in a vertical direction by inserting shims between shear blades and their horizontal seats for which purpose the holes in the bed and lever arm thru which the bolts 11 and 38 pass, are slotted in a vertical direction.

The preferred procedure in installing the king pin 24 in this alligator shear when the lever arm 30 is to be shrunk on the pin, is as follows: Prior to the installation of the king pin, the end covers 50 and 58 are not attached and the bushings 17 and 18 are not inserted in the bed; likewise, when the lever is to be shrunk on the pin 24 its bore 32 is machined slightly smaller than the diameter of the portions 27 and 28 of the king pin. Under these conditions the lever arm 30 is inserted between the bosses 5 and 6 with the bore 32 substantially alined with the bores 15 and 16 of the bosses 5 and 6; the hub 34 of the lever arm having been heated either prior to the positioning referred to or subsequent thereto. When the hub 34 has been heated sufficiently to expand it to the desired extent, the king pin 24 without the split collar 45, is inserted from left to right thru the bore 16, thru the bore 32, and thru the bore 15 until the collar 28 engages the shoulder 33, whereupon the lever is permitted to cool until it engages the portion 27 of the pin and collar 28 in shrinking relation. After the parts have cooled sufficiently the bushings 17 and 18 with their liners 21 and 22 are inserted in the bores 15 and 16 respectively, which operation is preferably performed with pressure. After the bushings are properly seated in the bosses 5 and 6, the split collar 45 and the clamp nut 55 are applied to the ends of the pin in the position hereinbefore pointed out, and the cover caps 50 and 58 are subsequently attached.

If the liners 21 and 22 should wear after extended service or if the face of the flanges 19 or 20 should wear, the bushings 17 and 18 are removed subsequent to the removal of the cover caps 50 and 58 and the collars 45 and 55, respectively. The removal of the bushings is facilitated by the provision of four tapped holes in the flanges 19 and 20, indicated at 19a and 20a, into which screws may be threaded which will progressively force the bushings outwardly away from the bosses 5 and 6. Repairs may then be made either by renewing the liners or by inserting shims between the flanges 19 and the outer faces of the bosses 5, as may be required, and by the replacing of the bushings, to the end that the machine may be placed in its original condition.

It will be evident that the herein disclosed alligator shear construction eliminates the imposition of dangerous unbalanced thrusts on the bearing located on that side of the lever arm opposite the fixed shear blade; produces a construction in which the opposed lateral thrusts incident to the shearing action of the blades are self contained and counteract each other thru the instrumentality of that bearing boss and associated parts located on the same side of the shear bed as the stationary shear blade; produces a king pin construction in which the radial and thrust bearings can readily be repaired or renewed; and which otherwise fulfills the objects of this invention set forth at the beginning of these specifications.

While the herein described disclosure illustrates this invention embodied in a shear of the "low knife type," that is, a type in which the shearing plane is substantially in line with the axis of the king pin, it is evident that this invention may be applied, with equal or greater advantage, to a shear of the "high knife type" in which the blades are raised so that the shearing plane is located a substantial distance above the axis of the king pin, this plane being in many cases in line with the top of the bearing bosses.

This improved shear may be built either right hand, as shown in the drawings, or left hand depending primarily upon the location in which the shear is to be used, the selection of the "hand" of the machine being governed by accessibility and by conditions limiting the feeding to a particular side.

It should be noted that in the broader concepts of this invention the lever arm need not be rotatably fixed to the kind pin but might be pivotally supported on the king pin which in turn might be rotatably fixed in the bosses of the bed.

Many other modifications of this invention and its application will naturally occur to those skilled in this art and the present disclosure should therefore be considered typical only, and I desire not to be limited to the exact constructions shown and described.

What I claim is:

1. In an alligator shear in combination, an elongated bed, a pair of transversely spaced bosses disposed intermediate the front and rear ends of the bed, a pin supported in the bosses, a lever arm axially fixed intermediate its ends on the pin between the spaced bosses and adapted to oscillate about the axis of the pin, a stationary shear blade mounted on a portion of the bed extending forwardly from and fixed to one of the bosses, a shear blade mounted on the forwardly extending portion of the lever arm adapted, when the lever is oscillated, to cooperate with the stationary blade in shearing relation, and power means adapted to oscillate the lever arm, the pin and the boss to which the forwardly extending portion of the bed is fixed being provided with interengaging axial thrust means adapted to transmit to said boss the transverse thrust incident to the shearing action of the blades.

2. In an alligator shear, in combination, an elongated bed, a pair of bosses rising from opposite sides of the bed, a king pin supported in the bosses and mounting a lever arm for pivotal movement about the axis of said pin, cooperating shear blades mounted on the bed and the lever arm respectively and adapted to impose axial thrust on the pin during shearing, and shoulder means cooperating with the pin and one of the bosses to receive said axial thrust and transmit the same inwardly through said one boss toward the center of the bed.

3. In an alligator shear in combination, an elongated bed, a pair of transversely spaced bosses disposed intermediate the front and rear ends of the bed, a pin supported in the bosses, a lever arm axially fixed intermediate its ends on the pin between the spaced bosses and adapted to oscillate about the axis of the pin, a stationary shear blade mounted on a portion of the bed extending forwardly from and fixedly connected with one of the bosses, a shear blade mounted on the forwardly extending portion of the lever arm adapted, when the lever is oscillated, to cooperate with the stationary blade in shearing relation, power means adapted to oscillate the lever arm, and shoulder means provided on the pin adapted to transmit, to that boss fixed to the stationary shear blade mounting, the entire transverse thrust incident to the shearing action of the blades, the pin being free to move in the direction of the thrust in the other of the bosses.

4. In an alligator shear in combination, an elongated bed, a pair of transversely spaced bearing bosses disposed intermediate the front and rear ends of the bed, a pin rotatably supported in the bosses, a lever arm fixedly mounted, intermediate its ends, on said pin between the spaced bosses, a stationary shear blade mounted on a portion of the bed extending forwardly from and fixedly connected to one of the bosses, a shear blade mounted on the forwardly extending portion of the lever arm adapted, when the lever is actuated, to cooperate with the stationary blade in shearing relation, power means adapted to actuate the lever arm, and a thrust collar engaging the bearing boss located on that side of the lever arm on which the stationary blade is located, said thrust collar being axially fixed on said pin.

5. In an alligator shear in combination, an elongated bed, a pair of transversely spaced bearing bosses disposed intermediate the front and rear ends of the bed, a pin formed with a pair of spaced journals rotatably supported in bearings in the bosses, a lever arm axially and rotatably fixed, intermediate its ends, on said pin between the spaced journals, a stationary shear blade mounted on a portion of the bed extending forwardly from and integrally formed with one of the bosses, said one boss being formed with a thrust surface at its outer face in a plane normal to the axis of the pin, a shear blade mounted on the forwardly extending portion of the lever arm adapted, when the lever is actuated, to cooperate with the stationary blade in shearing relation, power means adapted to actuate the lever arm, and a thrust collar axially fixed on the pin engaging the said thrust surface.

6. In an alligator shear in combination, an elongated bed, a pair of transversely spaced bosses fixed on the bed, bores formed in the bosses, bushings removably mounted in the bores, a pin formed with spaced journals rotatably supported in said bushings, a lever arm axially fixed intermediate its ends on said pin between the spaced journals, a stationary shear blade mounted on the bed adjacent one of the bosses, a shear blade mounted on the lever arm adapted, when the lever is oscillated, to cooperate with the stationary blade in shearing relation, and power means adapted to oscillate the lever arm, said pin being substantially smaller in diameter than said bores and being provided with a removable collar larger in diameter than the bores and adapted to transmit axial thrust to the outer face of the boss adjacent the stationary shear blade, thereby to resist the transverse thrust resulting from the shearing action of the blades.

7. In an alligator shear in combination, an elongated bed, a pair of transversely spaced bosses fixed on the bed, bores formed in the bosses, bushings formed with flanges engaging the outer faces of the bosses and removably mounted in the bores, a pin formed with spaced journals rotatably supported in said bushings, a lever arm axially fixed intermediate its ends on said pin between the spaced journals, a stationary shear blade mounted on the bed adjacent one of the bosses, a shear blade mounted on the lever arm adapted when the lever is oscillated to cooperate with the stationary blade in shearing relation, and power means adapted to oscillate the lever arm, said pin being substantially smaller in diameter than said bores and being provided with a removable collar larger in diameter than the bores and adapted to transmit axial thrust to the flange of the bushing mounted in the boss adjacent the stationary shear blade whereby said bushing resists the transverse thrust developed in the pin as a result of the shearing action of the blades.

8. In an alligator shear in combination, an elongated bed, a pair of transversely spaced bosses fixed on the bed, bores formed in the bosses, bushings formed with flanges engaging the outer faces of the bosses and removably mounted in the bores, a pin formed with spaced journals rotatably supported in said bushings, an annular shoulder provided on the pin which shoulder is larger in diameter than the journals and is positioned intermediate the journals, but is smaller in diameter than the bores, a lever arm mounted, intermediate its ends, on said pin between the spaced journals and formed with a stepped bore engaging the said shoulder, to resist axial movement of the lever arm on the pin, a stationary shear blade mounted on the bed adjacent one of the bosses, a shear blade mounted on the lever arm adapted, when the lever is oscillated, to cooperate with the stationary blade in shearing relation, power means adapted to oscillate the lever arm, the said pin being formed with a peripheral groove mounting a removable collar larger in diameter than the journals and adapted to engage the flange of the bushing mounted in the bore of the boss which is adjacent the stationary shear blade whereby said boss resists the transverse thrust developed in said pin as a result of the shearing action, and an adjustable collar adapted to engage the flange of the other bushing.

9. In an alligator shear in combination, an elongated bed, a pair of transversely spaced bosses fixed on the bed, bores formed in the bosses, bushings mounted in the bosses formed with flanges engaging the outer faces of the bosses, a pin formed with spaced journals rotatably supported in said bushings, a lever arm axially fixed intermediate its ends on said pin between the spaced journals, a stationary shear blade mounted on the bed adjacent one of the bosses, a shear blade mounted on the lever arm adapted when the lever is oscillated to cooperate with the stationary blade in shearing relation, power means adapted to oscillate the lever arm, said pin being substantially smaller in diameter than said bores and being provided on its end portion adjacent the last-named boss with a removable collar larger in diameter than the bores and adapted to transmit axial thrust to the flange of the bushing mounted in said boss whereby said boss resists the transverse thrust developed in the pin as a result of the shearing action of the blades, and a fixed oiltight cover enclosing the removable collar and the adjacent face of the flange.

LAD L. HERCIK.